April 10, 1928.
A. A. NERO
AEROPLANE
Filed Dec. 1, 1926
1,665,713
2 Sheets-Sheet 1
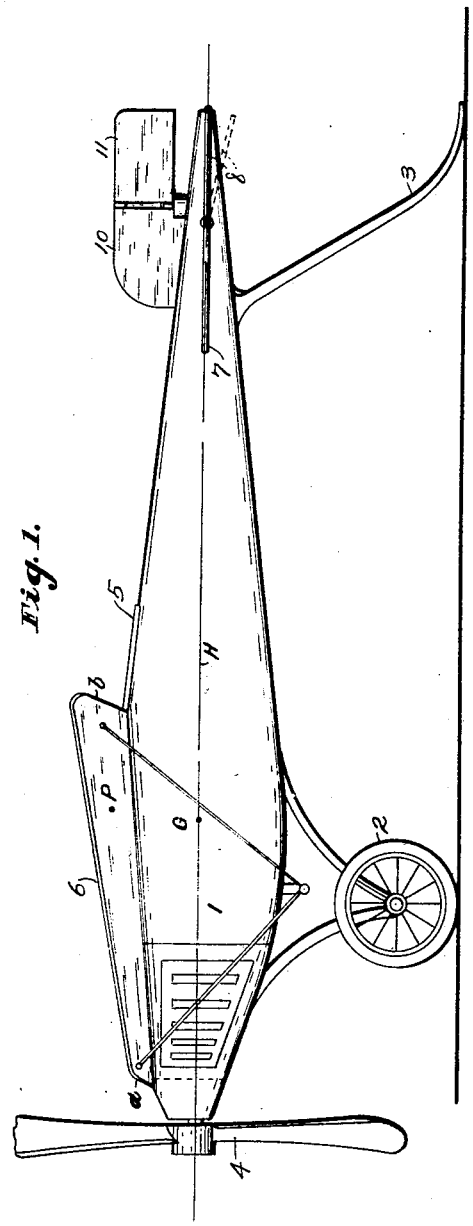
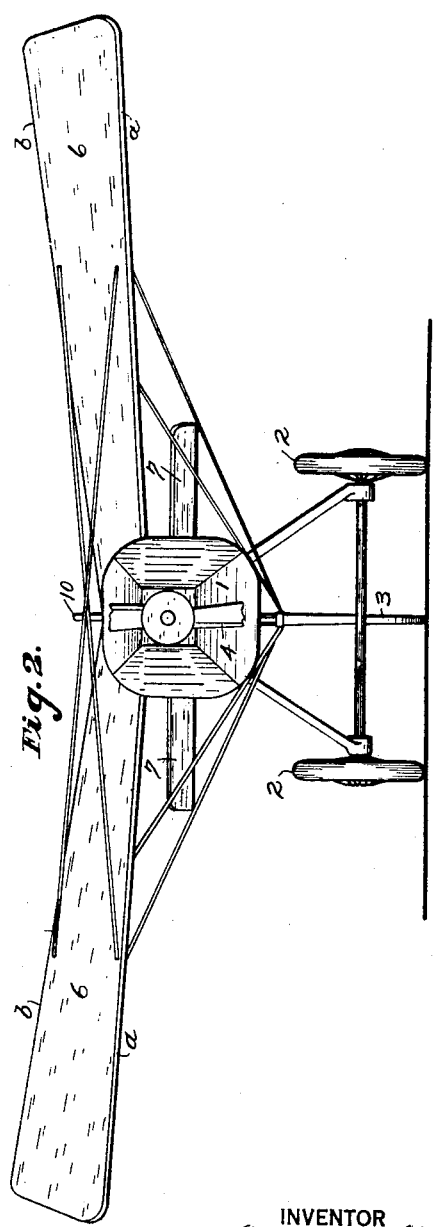
INVENTOR
Arthur A. Nero April 10, 1928.

A. A. NERO

AEROPLANE

Filed Dec. 1, 1926

INVENTOR
Arthur A. Nero

Patented Apr. 10, 1928.

1,665,713

UNITED STATES PATENT OFFICE.

ARTHUR A. NERO, OF ABRAMS, WISCONSIN.

AEROPLANE.

Application filed December 1, 1926. Serial No. 152,042.

My invention relates to improvements in aeroplanes, in which the air pressure sustaining the craft acts on the top surface of the wings.

The principal object of my invention is to provide aeroplanes with superior inherent stability, so they will be safe and require less skill to operate; another object is to increase the efficiency. These objects with others will become apparent from the following description and drawings:

In the drawings:

Figure 1 is a side elevation of the aeroplane.

Figure 2 is a front elevation.

Like parts are identified by the same reference characters throughout the several views.

Figure 3:
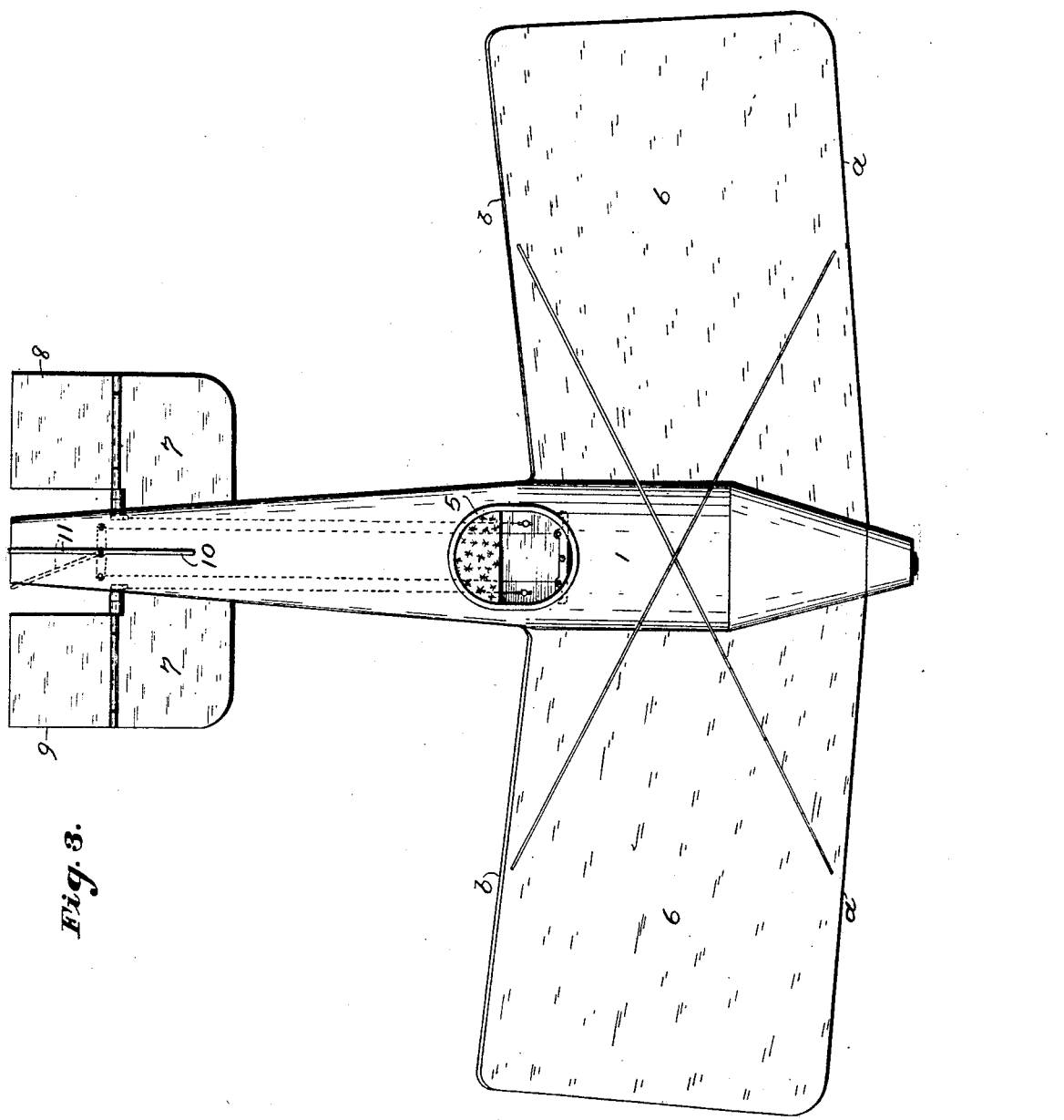
Figure 3 is a plan view.

The embodiment of this invention shown in Figures 1 to 3, inclusive, is provided with a fuselage or body 1, landing gear 2 and 3, and cockpit 5.

Supported from the body 1, is a pair of wings 6, having the leading edge $a$, and the trailing edge $b$, tilted up at a dihedral angle, the edge $b$, having more tilt than the edge $a$; the wings are secured to the body 1, at an angle to the horizontal center line H, of the body.

A tail member secured to the body 1, at the rear, comprising a stationary stabilizer 7, two adjustable elevators 8 and 9, and a vertical rudder 11, adapted to be controlled from cockpit by means of levers and cables.

*Longitudinal stability and support of the craft.*

When the craft is in motion, the tendency of air pressure acting on the top surface of the wings is to flatten out the wings and force the wings in a position in line with the line of flight thereby tending to twist or turn the craft out of a horizontal position on the axis $g$; the air pressure acting on the stabilizer surface prevents the craft from being twisted or turned out of a horizontal position; the result is longitudinal stability and support of the craft.

*Lateral stability.*

The craft is balanced laterally by the action of gravity, due to the dihedral angle of the wings and the relation of the center of gravity $g$, and the center of pressure $p$.

*Flight.*

The craft makes a short run on the ground until the speed is great enough so the air pressure acting on the wings and stabilizer is more than the weight of the craft; the craft will then ascend in a horizontal position; elevators 8 and 9 vary the climbing angle; they also serve to assist the rudder 11, on making a turn by lowering one or the other in connection with the rudder adjustment; descent is made by decreasing the speed, and the craft will stay in a horizontal position, but can be made to take other positions by means of the elevators.

On engine failure or stall, the craft will stay in a horizontal position and descend with a forward motion; the craft cannot go into a tail spin, or side slip, due to the shape of the wings and the position of the center of gravity.

Having thus described my invention, what I claim and desire to secure by Letters Patent is:

1. An aeroplane having a fuselage provided with scoop-shaped wings, leading and trailing edge of said wings tilted up at dihedral angles, the trailing edge having more tilt than the leading edge, said wings secured to the fuselage with the trailing edge higher than the leading edge measuring from the horizontal center line of the fuselage, means for stabilizing said aeroplane.

2. An aeroplane having a fuselage provided with scooped-shaped wings, leading and trailing edge of said wings tilted up at dihedral angles, the trailing edge having more tilt than the leading edge, said wings secured to fuselage with the trailing edge higher than the leading edge measuring from the center line of the fuselage, a tail member, comprising a stabilizer, two adjustable elevators, adapted to be controlled independently from the cockpit, and a vertical rudder.

3. An aeroplane having a fuselage provided with scoop-shaped wings, leading and trailing edge of said wings tilted up at a dihedral angle, the trailing edge having more tilt than the leading edge, said wings secured to the fuselage at an angle with the trailing edge higher than the leading edge measuring from the horizontal center line of the fuselage, means for controlling said aeroplane, means for propelling said aeroplane.

4. In combination, an aeroplane having a fuselage provided with a cockpit for the operator, wings having the form of a dihedral angle, the leading edge having a greater angle than the trailing edge said wings secured to the fuselage at an angle to the line of flight inclining rearwardly, a stabilizer secured to the fuselage at the rear in line with the line of flight, adjustable elevators hingedly mounted to said stabilizer and adapted to be controlled independently from the cockpit, a rudder adapted to be controlled from the cockpit.

ARTHUR A. NERO.